United States Patent [19]

Wolfe et al.

[11] 4,403,446
[45] Sep. 13, 1983

[54] HYDROPONIC GROWING MEDIUM AND METHOD

[75] Inventors: Richard E. Wolfe; Marvin G. Fiechtner, both of Cincinnati, Ohio

[73] Assignee: The Stearns & Foster Company, Cincinnati, Ohio

[21] Appl. No.: 282,946

[22] Filed: Jul. 13, 1981

[51] Int. Cl.³ .............................................. A01G 31/00
[52] U.S. Cl. .............................................. 47/58; 47/62
[58] Field of Search ..................... 47/48.5, 56, 58-65, 47/73-79, 81, 84, 87; 131/331, 341

[56] References Cited

U.S. PATENT DOCUMENTS

| | | | |
|---|---|---|---|
| 2,026,322 | 12/1935 | Raines | 47/63 |
| 2,189,510 | 2/1940 | Swaney | 47/59 |
| 2,486,512 | 11/1949 | Armstrong | 47/59 |
| 2,979,433 | 4/1961 | MacHenry | 131/341 |
| 2,993,300 | 7/1961 | Sawyer | 47/60 |
| 3,018,586 | 1/1962 | Farley | 47/81 |
| 3,190,294 | 6/1965 | Dunlap | 131/343 |
| 3,199,250 | 8/1965 | Sawyer | 47/60 |
| 3,233,365 | 2/1966 | Bergann | 47/63 |
| 3,241,264 | 3/1966 | Porter et al. | 47/14 X |
| 3,300,895 | 1/1967 | Dosedla et al. | 47/63 |
| 3,305,968 | 2/1967 | Dosedla et al. | 47/63 |
| 3,352,057 | 11/1967 | Ferrand | 47/62 |
| 3,362,106 | 1/1968 | Goldring | 47/87 X |
| 3,368,566 | 2/1968 | Avedikian | 131/331 |
| 3,375,607 | 4/1968 | Melvold | 47/73 |
| 3,456,386 | 7/1969 | Holden | 47/56 |
| 3,467,609 | 9/1969 | Adams et al. | 260/17.4 |
| 3,509,014 | 4/1970 | Stickney | 131/331 |
| 3,613,309 | 10/1971 | Coburn | 47/79 X |
| 3,660,933 | 5/1972 | Wong, Jr. | 47/59 |
| 3,738,060 | 6/1973 | Jullien-Davis | 47/47 X |
| 3,744,183 | 7/1973 | Kato | 47/62 |
| 3,757,470 | 9/1973 | Shimamoto et al. | |
| 3,766,684 | 10/1973 | Kato | 47/62 |
| 3,772,827 | 11/1973 | Ware | 47/39 |
| 3,831,317 | 8/1974 | Porte | 47/58 |
| 3,835,584 | 9/1974 | Shimazu | 47/41.13 X |
| 3,898,766 | 8/1975 | Goldstaub | 47/81 |
| 3,911,514 | 10/1975 | Ito | 47/59 |
| 3,927,491 | 12/1975 | Farnsworth | 47/59 |
| 3,973,355 | 8/1976 | McKenzie | 47/73 |
| 3,981,100 | 9/1976 | Weaver et al. | 47/58 |
| 3,995,397 | 12/1976 | Despard | 47/81 |
| 4,028,847 | 6/1977 | Davis et al. | 47/65 |
| 4,041,641 | 8/1977 | Dietz | 47/17 |
| 4,057,932 | 11/1977 | Spencer | 47/77 |
| 4,075,785 | 2/1978 | Jones | 47/64 |
| 4,077,158 | 3/1978 | England | 47/59 |
| 4,079,547 | 3/1978 | Walker | 47/62 |
| 4,103,457 | 8/1978 | Carlisle | 47/58 |
| 4,118,891 | 10/1978 | Kehl et al. | 47/59 |
| 4,189,868 | 2/1980 | Tymchuck et al. | 47/84 |
| 4,196,544 | 4/1980 | Davis et al. | 47/65 |

FOREIGN PATENT DOCUMENTS 922107  3/1973  Canada .................................. 47/77

*Primary Examiner*—James R. Feyrer
*Attorney, Agent, or Firm*—Wood, Herron & Evans

[57] ABSTRACT

A hydroponic growth medium in the form of a disposable tubular fibrous element. The tubular element consists of axially oriented internal fibers to provide good capillary or wicking properties to the element, and a shell surrounding the fibers to provide some structural integrity to the element. The element is of a cross-sectional area at one end that is sufficient to provide a satisfactory seat for a seed. In use, the disposable element is oriented in a generally vertical position, and a seed is placed on the seat defined by the element's top end surface. The element's bottom end is immersed in a nutrient solution, which is then continuously fed to the seed through the capillary action provided by the axially aligned fibers within the element. As the seed grows into a plant, the element's shell directs or controls the plant's root growth so that the roots proceed generally axially and downwardly through the element, rather than simply growing outwardly in random fashion through the element's side walls.

4 Claims, 9 Drawing Figures

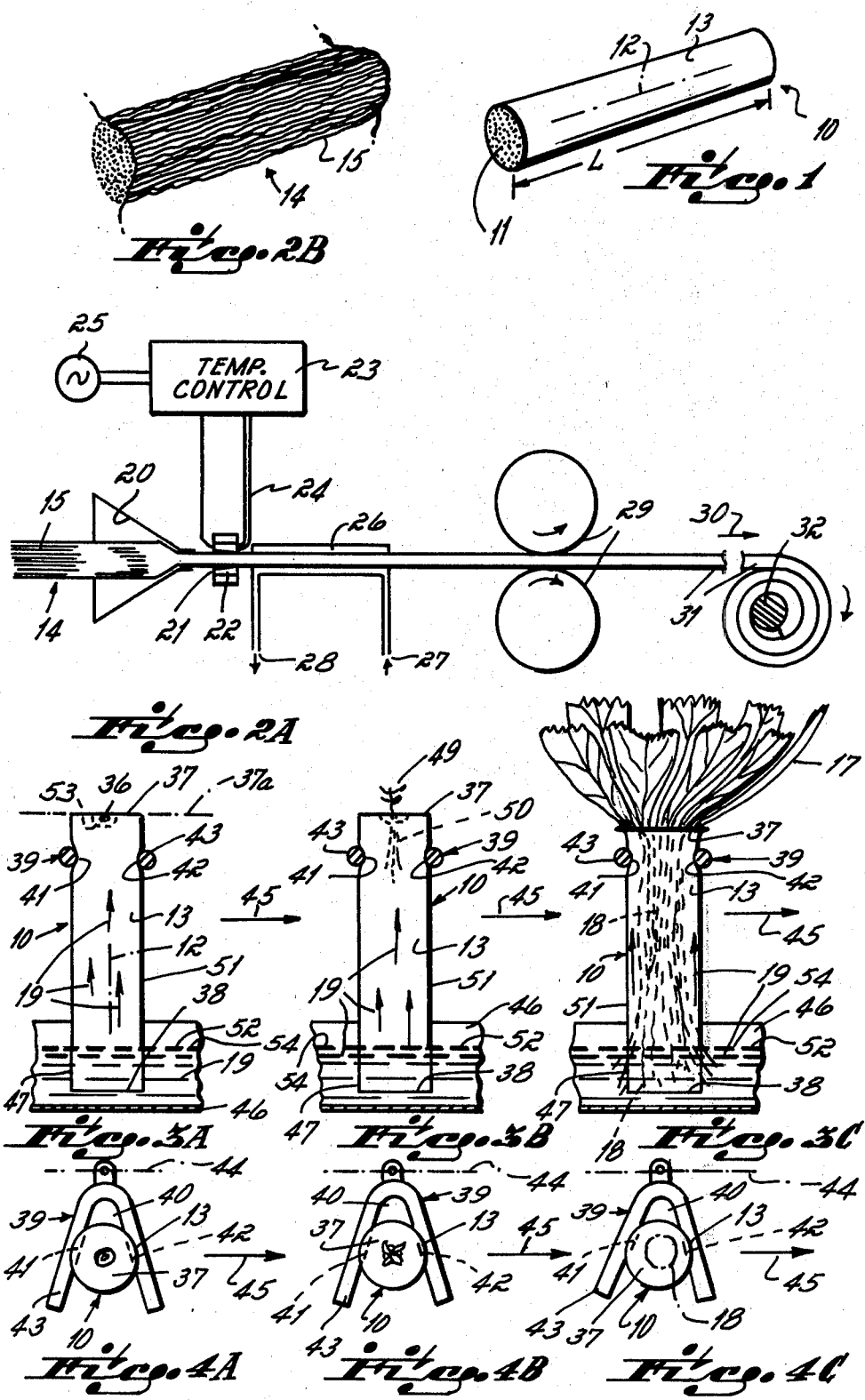

HYDROPONIC GROWING MEDIUM AND METHOD

This invention relates to hydroponic growing systems. More particularly, this invention relates to a hydroponic growth medium, and to a hydroponic growing method which makes use of that medium.

A hydroponic system for growing plants is a system in which those plants are grown without the use of natural ground or soil, i.e., a soilless growing system. In a hydroponic growing system, a plant is grown through exposure to a nutrient solution and to actinic radiation without the use of ground or soil in any way. In the past, hydroponic growth mediums have been used to provide, at least partially, a support structure for the plant's root system. These prior art mediums are in the nature of soilless supports into which the plant's roots grow as the plant grows from a seed or seedling toward the final desired plant stage. During use, the nutrient solution is flushed through the root system support on a periodic or continuous programmed basis. As the plant grows, it may be supported by some additional structure which cooperates with the plant's body separate and apart from its root system. When the plant is harvested, the plant's root system may or may not be removed from the growth medium.

Hydroponic growth mediums, as noted, are known to the prior art. A disposable hydroponic growth medium, as used herein, is a root system support structure for a plant which is not re-usable. During use, the plant's root system becomes so integrated with the hydroponic growth medium that the medium is not re-usable to grow a second plant. After the plant has grown to the desired stage, the growth medium and integrated plant root system often is cut away from the plant and disposed of prior to packaging or sale of the plant. Alternatively, the growth medium and integrated root system remain part of the plant as packaged and/or sold to the plant's end user, the end user then cutting same away from the plant for disposal thereof prior to use of the plant. One type of prior art hydroponic growth medium is fabricated in an open cup like configuration, a seat in the center being provided to receive and support the plant's seed. The cup shaped structure with seed thereon, is then exposed on a programmed basis to the nutrient solution and actinic radiation. This cup shaped medium may be formed from either a non-biodegradable material, e.g., a polyurethane foam, or a biodegradable material, e.g., wood pulp. When the cup is formed from an open cell polyurethane foam the cup like structure is relatively frangible, i.e., tends to fall apart, as the plant's root system grows into and through it, and it does not provide very good wicking or capillary action properties. Good capillary properties are desirable to deliver nutrient solution to the plant's root system when the medium is wetted with that solution. When the cup shaped medium is formed from wood pulp, the cup exhibits good capillary properties, and a little more structural integrity is provided to the cup structure, relative to the open cell polyurethane foam cup. But wood pulp can and does support bacterial growth. With some plants, e.g., certain vegetables, it may be desirable to market same in a package which wraps the vegetable, as well as the vegetable's root system and hydroponic growth medium, all in the same package. This cannot be done with a molded wood pulp cup since that would allow bacterial growth within the package between the packaging operation and the end use by a consumer. It is also known to the prior art to hydroponically grow a seed that is seated or placed on a wicking medium, that wicking medium being connected with a nutrient solution by virtue of one end resting in that solution. But in each case known to applicant, there are disadvantages which arise in the large scale use, i.e., commercial use, of this latter approach. For example, the independent structural support required for the growth medium may be commercially cumbersome or costly, or the medium itself may be of a relatively complex structure or costly or difficult to use in large scale practice. This latter concept is disclosed in Raines U.S. Pat. No. 2,026,322, Farley U.S. Pat. No. 3,018,586 and Dosedla et al U.S. Pat. No. 3,300,895.

Therefore, it has been one objective of this invention to provide an improved hydroponic growth medium, and method of use therefor, where one end of the medium defines a seat for a seed and the other end of the medium is partially immersed in a nutrient solution, where the medium exhibits good wicking or capillary properties, and where the medium is structured to direct the plant's root system from the point of seed support into the nutrient solution without allowing substantial growth of the root system outside the medium into atmosphere, thereby enhancing optimum transfer of nutrient solution to that root system.

Another objective of this invention has been to provide an improved hydroponic growth medium, and method of use, therefor, in which the medium is of a generally tubular configuration, that element consisting of internal axially oriented fibers to provide good capillary properties and a shell surrounding those fibers to provide some structural integrity to the element, the shell also functioning to direct a plant's root system growth internally of the element and reduce evaporation of nutrient solution conveyed by the element, when, during use, the element is oriented vertically with one end in a nutrient solution and a seed is seated on the other end.

Still another objective of this invention has been to provide an improved hydroponic growth medium, and method of use therefor, in which the medium and the plant's root system may remain attached to the plant as that plant is packaged and, thereafter, distributed to and purchased by a retail consumer, the medium being structured to enclose the plant's root system at least adjacent to the plant's head to provide a more aesthetically pleasing consumer product relative to prior art mediums, and the medium not supporting bacteria or fungus growth so as to provide no health hazard to the ultimate consumer.

It has been a further objective of this invention to provide an improved hydroponic growth medium that is producible in an endless length, rope like form that may be, e.g., coiled up on a reel, same being cut into desired length elements when use is needed by a grower, this advantage allowing the medium to be easily stored and shipped by the manufacturer, and easily stored and used by the grower.

In accord with these objectives, the hydroponic growth medium, and method of using same, in accord with the principles of this invention contemplates a disposable tubular fibrous element having good capillary or wicking properties. The fibrous element consists of fibers oriented axially of the section, and a shell surrounding the fibers to provide the section with some degree of structural integrity. The fibrous element's shell enables the internal fibers to be easily handled after the product is manufactured, and allows the product to be stored and shipped in an endless rope length that may be oiled up on a reel. The axially aligned fibers within the fibrous element enhance and promote the wicking or capillary action of that tubular element with a nutrient solution. In use, a fibrous element of desired length is cut from the endless rope length, the element then being gripped adjacent the top end and being oriented generally vertical to ground. A plant seed is placed on the top end of the element on the fibrous seat defined, and the bottom end of the element is immersed in a nutrient solution. The nutrient solution is continuously fed to the seed through the wicking action presented by the axially aligned fibers within the fibrous element. During growth of the seed into a plant, the element's shell directs or controls the plant's root growth so that it proceeds axially and downwardly through the element, rather than simply growing outwardly through the element's side wall, until the root growth extends into the nutrient solution. Thus, the fibrous element's shell prevents outward growth of the plant's root system through the element except where the element is immersed at its bottom end in the nutrient solution, thereby promoting efficiency in the growing process and promoting aesthetics in the finished plant product.

Other objectives and advantages of this invention will be more apparent from the following detailed description taken in conjunction with the drawings in which:

FIG. 1 illustrates a hydroponic growth medium, in accord with the principles of this invention, cut to desired length for use in growing a lettuce plant;

FIG. 2A is a diagrammatic view illustrating a method by which the hydroponic growing medium of this invention may be manufactured;

FIG. 2B illustrates a carded sliver section from which the hydroponic growth medium of this invention is formed;

FIGS. 3A–3C is a series of side views illustrating the method of use of the growth medium of this invention, FIG. 3A showing a fibrous element with seed implanted thereon as the initial step, FIG. 3B illustrating an intermediate stage during plant growth, and FIG. 3C illustrating the final stage of plant growth with the lettuce plant fully grown thereon; and FIGS. 4A–4C is a series of top views of those steps and stages of the plant growth cycle shown in FIGS. 3A–3C.

A tubular fibrous element 10 in accord with the principles of this invention is illustrated in FIG. 1. The fibrous element 10, which is a hydroponic growth medium, consists of interior fibers 11 oriented generally axially of, i.e., parallel to, the section's longitudinal axis 12, and a shell or casing 13 surrounding the interior fibers to provide the section with some degree of structural integrity. The fibrous sliver 14 from which the element 10 is formed, see FIG. 2B, is preferably in the nature of a bundle of oriented staple length fibers 11. Such staple length fibers 11 are of a discreet length, e.g., the staple length being between about one inch and two inches long. The medium's interior fibers, however, also could be comprises of a fiber tow (not shown). A fiber tow is in effect, comprised of continuous length fibers as opposed to the staple or discreet length fibers of the fiber sliver 14.

The interior fibers 11 of the growth medium, i.e., of the fibrous element 10, are surrounded by the shell 13 which provides the element with some degree of structural integrity, as previously mentioned. In the preferred embodiment shown, and as described in greater detail below, the shell 13 may be formed by heat sealing or melting the outer most fiber layer 15 of the carded sliver 14 when the fibers 11 are meltable. With regard to this melted or heat sealed shell 13, such must be established so that substantially no melting together occurs of the fibers 11 interiorly of that shell. In other words, melting or welding or gluing together of interior fibers 11 within the fibrous element's shell is not desirable because such would impede the capillary or wicking action expected of the hydroponic growth medium 10 during use. As a result, the growth of a plant's root system also would be impeded to some extent which, of course, is not desirable in commercial practice. Alternatively, and instead of the integrally formed exterior shell 13 of the element 10, the exterior surface or shell of the element could be comprised of a woven fabric, a braid type winding with filament or thread or string, or some other shell or casing that mechanically surround the interior fibers 11.

The axial or longitudinal orientation of the interior fibers 11 within the fibrous medium 10 improves the capillarity or wicking properties of that growth medium relative to that which would be the case if the fibers were randomly oriented throughout the length of that section. Further, and importantly, the axial orientation of the element's interior fibers 11, in combination with the element's exterior shell 13 tends to direct a plant's root growth 18 downwardly and axially through the medium into a nutrient solution 19 within which one end of the section is immersed as described in greater detail below, see FIG. 3C. In other words, the medium's shell 13 tends to direct or control the plant's root growth 18 so that it proceeds axially and downwardly through the element 10, rather than simply growing outwardly through the element's shell. Further, the growth medium's shell 13 enables the medium's interior staple fibers 11 to be easily handled when the product is manufactured in an endless rope length form as also described in greater detail below.

It is desirable that the element or medium 10 possess a couple of certain characteristics. First, it is desirable that the interior fibers 11 have a denier less than about 100. A denier above the maximum noted would provide substantially no practical capillary action during use of the element 10 in the hydroponic growing method of this invention. Further, a denier above the stated maximum would provide substantial difficulty in manufacture of the growth medium 10 in endless length as described in detail below. Second, it is desirable that the bulk density of the interior fibers 11 for the fibrous element 10 be between about 0.02 grams/cc and 0.10 grams/cc. In this regard, it is preferred that the higher the denier the lower should be the density of the medium, and the lower the denier the higher should be the density of the medium. As to the shell 13 of the medium 10, it is preferred that this shell, in cooperation with the interior fibers 11 of the element 10, provide the medium 10 with a bending length greater than that which would be provided for the interior fibers 11 by themselves. In other words, and under the cantilever bending test, CCC-T-191b, Method 5206, which is published as a federal specification by General Service Administration, Business Service Center, Region 3, Washington, D.C. under the title Textile Test Methods, it is preferred that the fibrous medium 10 have a bending length which is at least 50% greater than the fibrous carded sliver 14 from which that element 10 is fabricated.

The medium's interior fibers 11 may be either biodegradable or may be non-biodegradable. Biodegradable fibers may be preferred when the fibrous element 10 is used, e.g., to start a seed's growth hydroponically, and thereafter to transplant that seed with the integrated root system/fibrous element 10 into soil. Biodegradable fibers, of course, will rot when planted in soil. In other words, and with biodegradable fibers, it is contemplated that a seedling and fibrous element 10 comprise a seed starter unit for eventual transplant into natural ground. In this end use the length of the fibrous element 10 might be in the neighborhood of one inch or so. Biodegradable fibers include natural fibers such as wool and cotton, and certain synthetic fibers such as cellulose acetate and viscose. It is also contemplated, however, that the fibrous element's interior fibers 11 be comprised of non-biodegradable fibers. Non-biodegradable fibers are preferred when plants 17 grown through use of the hydroponic growing medium 10 are packaged and sold with the plant's root system 18 and medium intact with the plant. This might be the case, for example, when growing lettuce plants 17 for commercial vegetable product purposes as described in detail below and as shown in FIGS. 3C and 4C. Non-biodegradable fibers will not rot or support fungus or bacteria growth when enclosed in moisture impervious packaging materials. Preferred non-biodegradable fibers 11 are polypropylene, polyethylene terephthalate, and mixtures thereof. The most preferred fibers to form the fibrous element 10 of this invention is a polypropylene and polyester mixture where the former is present in 33% by weight and the latter is present in 66% by weight. Other useful non-biodegradable fibers are nylon, acrylic, polyvinyl acetate, polyethylene, polyvinyl chloride, and mixtures thereof. With regard to the non-biodegradable fibers, generally same are hydrophobic. But it is desirable to promote the capillary or wicking action of the element 10 as much as possible, so if necessary a hydrophilic coating may be provided on the fiber as long as that finish is not detrimental to plant growth.

EXAMPLE

A hydroponic growth medium, in accord with that illustrated in FIG. 1, is provided in a length of about 100 feet and a diameter of about ⅜". A fiber mixture of about 33% by weight of 3 denier polypropylene and 66% by weight of 6 denier polyethylene terphthalate is used. The fibers have bulk density of about 0.05 grams per cc. The internal fibers 11 are staple length fibers of about 1" to 2" in length. The shell 13 is formed in accord with the manufacturing method described below where die 21 is at a temperature of about 475° F., and the carded sliver 14 is drawn through the die at a rate of about 8 feet/minute. The ⅜" diameter medium, per cantilever bending test CCC-T-191b, Method 5206, has an average bending length of about 9.1" whereas the carded sliver 14 from which the medium is formed has an average bending length of about 5.0".

A two inch length of the endless length medium so formed was cut therefrom, the opposite end surfaces being generally transverse to the element's axis. Thereafter, a lettuce plant was hydroponically grown making use of the medium in accord with the method described below and illustrated in FIGS. 3A–4C.

Manufacture of a tubular fibrous medium 10 in accord with the principles of this invention is illustrated diagrammatically in FIGS. 2A and 2B. The manufacturing method herein described is for use with a carded sliver 14 comprised of 33% by weight polypropylene and 66% by weight polyester where the axially aligned fibers 11 are between about one inch and about two inches long. This, of course, results in a non-biodegradable growth medium 10. The carded sliver 14 of the staple length fibers 11 is fed into a reducing funnel 20 initially for reducing the diameter of the cylindrical feed sliver. The downstream manufacturing equipment from the reducing funnel 20 includes a die 21 that is heated by a band heater 22, the band heater being controlled by a temperature controller 23 with the die's temperature being sensed by a thermocouple probe 24. The band heater 22 and temperature controller 23 are electrically connected with an electric power source 25. A cooling jacket 26 with coolant inlet 27 and outlet 28 is positioned downstream from the heated die 21, and counter rotating draw rolls 29 are positioned downstream from the cooling jacket, note machine direction arrow 30.

During use, and after the carded sliver 14 is reduced in cross-sectional size by the reducing funnel 20, it is directed through the heated die 21. The heated die 21 is at a temperature which causes the outer surface layer 15 of the fibers 11 to melt, thereby forming the element's shell 13 by melting the fibers together. In this regard, therefore, the die 21 must operate above the melting temperature of the fibers 11 being processed therethrough, and in the case of the preferred fiber mixture the die operates above the melting temperature of both polyethylene terephthalate and polypropylene. Note particularly that the fibers 11 are introduced to the reducing funnel 20 in a carded attitude so that the fibers are generally axially aligned relative to the longitudinal axis 12 of the sliver 14. After the fibers 11 exit from the die's mouth, same are in endless length rope configuration which must be cooled and, therefore, that endless rope length is passed through the cooling jacket 26. The downstream draw rolls 29 function to draw the carded sliver 14 through the funnel 20, through the die 21, and through the cooling jacket 26. With the hydroponic growth medium 10 so formed being an endless rope length 31 which is flexible, it may be easily handled. The flexible endless rope length 31 allows the hydroponic growing medium 10 to be wound or coiled up on a reel 32 for storage and/or shipment from manufacturer to grower. Further, the endless rope length 31 allows a grower to easily handle and make use of the hydroponic growing medium since the endless rope length can be played off the reel 32 and cut to desired length L by the grower quite easily. This tends to promote mechanization of the hydroponic growing system used by the grower. And it is because of the shell 13 provided on the endless rope length 31 that the hydroponic growing medium can be easily handled by the manufacturer and by the grower, in addition to the desirable advantages that the shell provides to a cut-to-length fibrous element 10 during use as mentioned above and as described in further detail below when describing the use of the hydroponic growth medium.

Use of the hydroponic growing medium 10 of this invention is illustrated in FIGS. 3A–3C and 4A–4C. Those figures illustrate use of the medium in growing a lettuce plant 17 from initial deposit of a seed 36 on one end surface 37 of the medium (see FIGS. 3A and 4A) through an intermediate growing step (see FIGS. 3B and 4B) to the final commercially saleable plant just prior to removal (shown in FIGS. 3C and 4C).

Initially, and as previously mentioned, the hydroponic growing medium 10 of this invention is fabricated, as illustrated in FIG. 2, in an endless rope 31 length. This endless rope 31 length may be coiled up on a reel 32 and shipped from manufacturer to grower. When the grower decides to make use of the medium 10, the endless rope 31 length is uncoiled from the reel and separate short fiber rope sections of length L cut therefrom. Typically, these fibrous elements 10 may be on the order of two inches or so in length with a diameter of one-half inch or so. Since the elements 10 are cylindrical in configuration, when cut from the endless rope 31 length each element includes top 37 and bottom 38 surfaces which are generally normal to the section's longitudinal axis. After being cut to length, and as illustrated in FIGS. 3A and 4A, each element 10 is individually inserted into a V-shaped friction clip 39 so that each section's axis 12 is oriented in generally vertical fashion. Note particularly the inner throat 40 of the V-shaped friction clip 39 is sized so as to compress (as at 41, 42) the element 10 between the clip's arms 43, thereby restraining it in generally friction fit relation with the clip, see FIG. 4A. In this regard, and if the medium 10 is of about two inches in length, the element 10 is positioned in the clip so that about one-half inch extends above the clip 39 and about one and one-half inches extends beneath the clip. The clips 39 themselves are preferably mounted on a conveyor mechanism (shown diagrammatically by center line 44) which is structured to move the clips in a machine direction shown by phantom arrow 45. The V-shaped friction clips 39 are also positioned above a pan 46 or other type vessel adapted to receive the liquid nutrient or growing solution 19 therein. The clips 39 are located above the pan 46 so that the bottom end section 47 of each element 10, e.g., the bottom one-half inch or so thereof, extends into the nutrient growing solution 19 provided in the pan as shown in FIG. 3A. It is contemplated that the V-shaped friction clips 39 and, therefore, the fibrous medium 10 held by each, will proceed from an in-feed end (not shown) of the pan 46 to a take-off end (not shown) of the pan in the machine direction 45 at a very slow rate all the while exposing the element 10 (and the plants 17 being grown thereon) to actinic radiation such as is found in sunlight. The structural integrity provided to the element 10 by shell 13 cooperates to enhance the element's resistance to being bent out of the solution 19 as it is moved in the machine direction 45 from one end of the pan 46 to the other.

In other words, the structural integrity of the fibrous element 10, as provided by the shell 13, insures that the bottom end 47 of the element will remain in the nutrient solution 19 as the rope section is slowly moved through that solution. If this were not the case, movement of the vertically oriented rope section would cause the bottom end 47 of the element 10 to bend out of the nutrient solution 19 and ride on the surface 52 thereof, which would be undesirable. Further, in this regard, it may be the case that the nutrient solution 19 in the pan 46 is caused to flow transverse to, i.e., perpendicular to, the travel direction 45 of the fiber element 10 through the pan. The objective with this nutrient solution cross flow is to replenish nutrients and oxygen in the solution by recycling the solution. Again, the structural integrity of the fiber element's shell 13 is sufficient so as to withstand this solution counter flow as the element 10 are moved by the clips 39 in generally vertical orientation through the solution in the pan 46 from one end thereof to the other. Also, the cylindrical shape of the element 10 in the bottom end 47 section where the element enters the nutrient solution is such as to provide minimum interference or turbulence in the nutrient solution as the element is moved slowly through the solution from one end of the pan 46 to the other.

With the fibrous element 10 properly positioned in the friction clip 39, a plant's seed 36 is positioned on the top end surface 37 thereof. In this regard, note the area of end surface 37 is substantially greater than the cross sectional area of seed 36 to be placed thereon. The top end surface 37 is particularly amenable to receipt of the plant seed 36 in a seat 53, i.e., to act as a seat for the seed, because the interior fibers 11 are easily depressed in the vertically downward direction to define the seat 53 since those fibers are axially or longitudinally aligned with the longitudinal axis 12 of the element 10. In other words, seed 36 may be recessed beneath the top end plane 37a of the element 10 so it is not easily shaken or vibrated off its seat thereon. This permits the seed 36 to be deposited on the top end surface 37 of the element 10 by mechanical deposit means if desired because perfect accuracy is not required, and allows a nominal depression or seat 53 to be easily formed in that top end surface 37 by the mechanical deposit means so that the seed is not easily dislodged therefrom during the initial stages of the growing process. Also, the seeds 36 as placed on the top end surface 37 of the element 10 may be pre-germinated or not, but in light of the axially aligned internal fibers 11 of the element either a pre-germinated seed or a non-pre-germinated seed may be easily pushed down into that end surface 37 since it is so easy to puncture. This initial seed 36 seating step in the top end surface 37 of the fibrous element 10 is illustrated in FIGS. 3A and 4A.

Subsequently, the growth medium 10 is moved from one end toward the other end of the pan 46 in the machine direction 45, all the while retaining the bottom end 47 of the element 10 in immersion within the nutrient solution 19, and while exposing the seed 36 to actinic radiation, e.g., to sunlight. The wicking or capillary properties of the element 10 insure that the seed 36 and the plant's root system are continuously exposed to nutrient solution as the medium 10 moves one pan 46 end to the other pan end. In other words, the nutrient solution 19 is continuously fed to the seed 36 in the plant growing cycle's initial stage through the wicking action presented by the axially aligned fibers 11 within the element 10. This, of course, initially causes the seed to germinate into a seedling 49 with an immature root system 50 as shown in FIGS. 3B and 4B. As the seedling 49 gets farther along in its growth cycle, the plant eventually achieves a commercial growth state as shown in FIGS. 3C and 4C. In this commercial growth state the plant 17 (in the drawings a lettuce plant being shown) is ready for removal and packaging. Due to the structural characteristics of the fibrous element of this invention, same provides inherent advantages in the growth of the plant 17 during its growing cycle from seed 36 or seedling 49 to finished commercially saleable plant 17. In this regard, and as shown in FIGS. 3B, 4B, 3C, 4C, note particularly that the plant's root system 50, 18 is directed downwardly, in generally axial fashion, from the element's top end surface 37 into the nutrient solution 19. In other words, the root system 50, 18 of the plant 49, 17 generally does not break through or extend outwardly from the side walls 51 of the element 10 between the seed's seat 53 and the top surface 52 of the nutrient solution into which the element's bottom end 47 is immersed. But the fiber element's shell 13, as the plant grows toward its commercially saleable condition, is generally destroyed beneath the top level 52 of the nutrient solution 19 so that the root system 18 branches out beneath that solution level 52 beyond the confines of the shell as shown in FIG. 3C. It is possible that the root system 18 would even start to break out of the element's shell 13 sightly above the solution line 54 on the element 10, but most assuredly the plant's root system 18 never breaks out of the element's shell between the support for the element 10 (i.e., the V-shaped clamp 39) and the head 17 of the plant. This root system enclosure feature is important for the reason that it insures maximum possible exposure of the plant's root system 50, 18 to the nutrient solution 19 due to the medium's wicking action, and, therefore, maximum plant growth rate in a minimum time frame. Further, and importantly, it is often the case that the plant 17 and medium 10 will be packaged and marketed together, i.e., the plant's root system 18 will now be separated from the plant's head 17, as packaged and sold at retail. When this is the case, the aesthetics of the root system 18 is generally thought to be more pleasing to the end user, e.g., a retail buyer of the lettuce 17, in that it is primarily confined within the element's shell 13 and does not extend outwardly therefrom except at the bottom end 47.

As the plant 17 reaches its commercially saleable size, i.e., as it grows from a seed 36 to the final marketable plant 17, the plant's head 17 becomes heavier and this heavier weight is supported by the V-shaped clips 39. In other words, the V-shaped clip 39 functions initially to hold the hydroponic growing medium 10, i.e., the fibrous element 10, in proper relation with the nutrient solution 19, and of course it initially has sufficient structural integrity to support the seed 36 or pre-germinated seed and seedling 49 thereon. But as the plant 17 grows toward commercially saleable size the structural integrity of the element 10 is not sufficient to support it, and such a function falls to the V-shaped friction clips 39.

Once the commercially saleable plant 17 has been fully grown, as shown in FIGS. 3C and 4C, the plant and the fibrous element 10 (including root system 18) may be easily and quickly removed from the V-shaped clip 39. The root system 18 and medium 10 may be cut from the lettuce plant 17 and thrown away, the lettuce then being marketed in historically known fashion to the retail consumer. Alternatively, the fibrous element 10 and root system 18 may remain connected to the plant head 17, and the entire combination marketed in that fashion. In this latter marketing approach, and in the case of, e.g., lettuce 17, it is comtemplated that the entire lettuce head and root system 18 (as encased in the fiber element 10) be packaged in a single package. If this latter approach is used, it is important that the fiber element 10 be made of a non-biodegradable fiber material such as the preferred fiber mixture earlier mentioned. If non-biodegradable fibers 11 are used, bacteria and fungus cannot grow or be supported within the package when the entire plant head 17 and root system 18 is packaged together.

The hydroponic growing medium 10, and the method by which it is used, all in accord with the principles of this invention, provides a number of advantages relative to mediums and methods known to the prior art. In the first instance, and when a non-biodegradable fiber 11 is used, the medium 10 will not support bacteria or fungus growth, thereby making it desirable during distribution of plants marketed intact with root systems. Further, the hydroponic growing medium 10 provides good wicking or capillarity characteristics due to the axially aligned fiber 11 orientation, thereby enhancing the hydroponic growth of plants that are grown with it. Also, the capillarity or wicking action of the medium 10 can be controlled by the type of fiber 11 used, by the density of the internal fibers, and by the fiber denier. Additionally, initial placement of a plant's seed 36 on the top surface 37 of the element 10 provides a degree of permanence or stability to the seed since it is set in place on a horizontal surface that may be easily and simply depressed to provide a cup shape configuration in which the seed can rest, thereby promoting the use of mechanical handling equipment in the growing process. Also, the root system 50, 18 of the plant 49, 17 is directed downwardly into the nutrient solution 19 without exposure thereof to atmosphere during growth of the plant, thereby tending to inhibit evaporation of nutrient solution as it wicks up from the pan 46 of solution to the element's end surface 37 on which the seed 36 is seated. This tends to maintain a better nutrient balance as supplied to the seed since the liquid carrier for the nutrient solution is not being evaporated off as it wicks upwardly through the rope section in the initial growing stages. The hydroponic growing medium 10 also has a reasonable degree of structural stability due to the shell 13 which surrounds the axially aligned fibers 11, thereby allowing the endless length rope 31 to be easily handled by the grower, and insuring that the element 10 remains immersed in the nutrient solution (as opposed to bending up to the surface 52 thereof) as the vertically oriented element is drawn through the solution. Additionally, the hydroponic growing medium 10 is believed aesthetically pleasing to retail consumers when plants, e.g., vegetables such as lettuce, are sold where the root system 18/medium 10 has not been removed therefrom. Importantly, also, the hydroponic growing medium 10 provides a low unit cost for each length L of medium, that being desirable since the rope section is destroyed during use and is not a resuable item. The hydroponic growth medium 10 is further quite easy for a grower to handle since it is supplied in endless length rope 31 form, and is therefore suceptible to mechanical handling during set up for use in a hydroponic growing system.

Having described in detail the preferred embodiment of our invention, what we desire to claim and protect by Letters Patent is:

1. A method of hydroponically growing a plant, said method comprising the steps of
providing an elongated element of non-biodegradable fibers, said element having an exterior shell that surrounds the internal fibers which is formed from the outermost layer of said fibers by melting the outermost layer of said fibers, said internal fibers being oriented generally axially of said element, said fibers being adapted to provide capillary transfer of a nutrient solution from one end of said element to the other end of said element, said fibers selected from the group consisting of polypropylene, polyethylene terephthalate, nylon, acrylic, polyvinyl acetate, and mixtures thereof, said elongated element having a bending length at least about 50% greater than the bending length of the fiber sliver or fiber two from which said element is produced, said internal fibers having a bulk density between about 0.02 grams per cc and about 0.10 grams per cc, and said internal fibers having a denier of less than about 100, orienting said elongated element in a generally vertical fashion, gripping said elongated element between its ends for restraining said element in said generally vertical orientation, said gripping being accomplished by partially deforming said element upon insertion of that element in a generally V-shaped clamp so that said element's one end is above said clamp when said element's other end is immersed in said solution, said element initially being restrained within said clamp due to the deformation of said element by said clamp, seating a seed on said element's one end, said one end having a surface area substantially greater than the cross-sectional are of said seed, and immersing said element's other end in a nutrient solution, said shell cooperating with said plant's root system during growth of said plant so as to direct said root system from said element's seat end toward said element's nutrient solution end while confining said root system interiorly of said element within said shell substantially throughout that section of said element not exposed to said nutrient solution, said interior confinement being in response to the structural integrity provided by said element's shell, the immersion lasting for a sufficient time period to permit and promote root growth within said element as well as exterior to said element, but the exterior root growth occurring only at that end of said element immersed in the nutrient solution.

2. A method of hydroponically growing plants as set forth in claim 1, the top end surface of said element being oriented generally parallel to ground, and the top end surface area being defined by fibers easily deformable in an axial direction, thereby allowing said seed to be easily positioned on the top end surface in a position at least partially recessed beneath the end plane of the top end surface.

3. A method of hydroponically growing plants as set forth in claim 1, said method comprising the further steps of producing said elongated element in endless length form, and cutting said element to a desired use length from said endless length form prior to growing a plant through use of said element.

4. A method of hydroponically growing a plant as set forth in claim 1, said seed being seated on the top end surface of said element after said element has been generally vertically oriented, said seed being separate from said element until seated thereon.

* * * * *